United States Patent
Chadha et al.

(10) Patent No.: US 6,301,575 B1
(45) Date of Patent: Oct. 9, 2001

(54) USING OBJECT RELATIONAL EXTENSIONS FOR MINING ASSOCIATION RULES

(75) Inventors: Atul Chadha; Balakrishna Raghavendra Iyer, both of San Jose, CA (US); Karthick Rajamani, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/191,424

(22) Filed: Nov. 12, 1998

Related U.S. Application Data

(60) Provisional application No. 60/065,339, filed on Nov. 13, 1997.

(51) Int. Cl.[7] .............................. G06F 17/30; G06F 7/00
(52) U.S. Cl. ................................................................ 707/2
(58) Field of Search ............................ 707/2, 3, 6, 505, 707/509

(56) References Cited

U.S. PATENT DOCUMENTS

| | | | |
|---|---|---|---|
| 5,615,341 | * 3/1997 | Agrawal et al. | 395/210 |
| 5,724,573 | * 3/1998 | Agrawal et al. | 395/606 |
| 5,794,209 | * 8/1998 | Agrawal et al. | 705/10 |
| 5,813,003 | * 9/1998 | Chen et al. | 707/6 |
| 5,819,266 | * 10/1998 | Agrawal et al. | 707/6 |
| 5,832,482 | * 11/1998 | Yu et al. | 707/6 |
| 5,842,200 | * 11/1998 | Agrawal et al. | 707/1 |
| 5,943,667 | * 8/1999 | Aggarwal et al. | 707/3 |
| 5,983,222 | * 11/1999 | Morimoto et al. | 707/6 |
| 6,032,146 | * 2/2000 | Chadha et al. | 707/6 |
| 6,061,682 | * 5/2000 | Agrawal et al. | 707/6 |
| 6,108,004 | * 8/2000 | Medl | 345/346 |

* cited by examiner

Primary Examiner—Jack Choules
Assistant Examiner—Linh M Pham
(74) Attorney, Agent, or Firm—Gates & Cooper LLP

(57) ABSTRACT

A method, apparatus, and article of manufacture for computer-implemented use of object relational extensions for mining association rules. Data mining is performed by a computer to retrieve data from a data store stored on a data storage device coupled to the computer. A multi-column data store organized using a multi-column data model is received. One of the columns in the multi-column data store represents a transaction, and each of the remaining columns in the multi-column data store represents elements of that transaction. A combination operator is performed to obtain candidate itemsets of data from the multi-column data store, each itemset being a combination of a number of rows of the multi-column data store. Large itemsets of data are generated from the candidate itemsets, wherein each itemset has at least a minimum support. Association rules are generated from the large itemsets of data, wherein each association rule has at least a minimum confidence.

24 Claims, 5 Drawing Sheets

USING OBJECT RELATIONAL EXTENSIONS FOR MINING ASSOCIATION RULES

PROVISIONAL APPLICATION

This application claims the benefit of U.S. Provisional Application No. 60/065,339, entitled "USING DB2'S OBJECT-RELATIONAL EXTENSIONS FOR MINING ASSOCIATION RULES," filed on Nov. 13, 1997, by Atul Chadha et al., attorney's reference number ST9-97-127, which is incorporated by reference herein.

BACKGROUND OF THE INVENTION

1. Field of the Invention

This invention relates in general to computer implemented data mining, and in particular to using object relational extensions for mining association rules.

2. Description of Related Art

There has been a rapid growth in the automation of data collection procedures in the last decade. This has led to a vast growth in the amount of usable data. Translating this usable data to useful information requires the use of a variety of data mining and knowledge extraction techniques. Accompanying these developments has been the growth of reliable, highly optimized relational database systems. As more and more data stores begin to rely on these database systems, the integration of the mining techniques with the database systems becomes desirable. However, efficient utilization of database systems as mining engines requires some modifications to the relational database system and to data organization.

Data mining is the process of finding interesting patterns in data. Data mining retrieves interesting data from a very large database, such as a database describing existing, past, or potential clients that may have thousands of attributes. A database is a set of records that are described by a set of attributes which have values.

Conventional data mining techniques do not work well on a database with a large number of attributes. In particular, most conventional data mining techniques only work one data in memory. Therefore, if the data is so large that it must be stored other than in memory, the data mining techniques will move data into memory to operate on the data, which is inefficient both in terms of memory usage and time.

The successful automation of data collection and the growth in the importance of information repositories have given rise to numerous data stores, ranging from those of large scientific organizations, banks and insurance companies, to those of small stores and businesses. The abundance of data has required the use of innovative and intricate data warehousing and data mining techniques to summarize and make use of the data.

There has been significant activity in developing new techniques for knowledge extraction, which is described further in G. Piatetsky-Shapiro and W. J. Frawley, *Knowledge Discovery in Databases*, AAAI/MIT Press, 1991, which is incorporated by reference herein. Some of the new techniques are for classification of data, which is further described in S. M. Weiss and C. A. Kulikowski, *Computer Systems that Learn: Classification and Prediction Methods from Statistics, Neural Nets, Machine Learning and Expert Systems*, Morgan-Kauftnann, 1991; R. Agrawal, S. Ghosh, T. Imielinski, B. Iyer, and A. Swami, *An Interval Classifier For Database Mining Applications*, Proceedings of the 18th International Conference on Very Large Databases, pages 560–573, August 1992; which are incorporated by reference herein.

Some of the new techniques for knowledge extraction are for clustering of data. T. Zhang, R. Ramakrishnan, and M. Livny, Birch, *An Efficient Data Clustering Method For Very Large Databases*, Proceedings of the 1996 ACM SIGMOD International Conference of Management of Data, 1996; R. T. Ng and J. Han, *Efficient And Effective Clustering Methods For Spatial Data Mining*, Proceedings of the 20th International Conference on Very Large Databases, 1994; A. K. Jain and R. C. Dubes, *Techniques For Clustering Data*, Prentice-Hall, 1988; L. Kaufman and P. J. Rousseeuw, *Finding Groups In Data—An Introduction To Cluster Analysis*, Wiley, 1990, which are incorporated by reference herein.

Some of the techniques for knowledge extraction are for discovery of association rules, and association rules are derived from and used to represent frequently occurring patterns within the database. R. Agrawal., T. Imielinski, and A. Swami, *Mining Association Rules Between Sets Of Items In Large Databases*, Proceedings of SIGMOD '93, pages 207–216, May 1993; R. Agrawal and R. Srikant, *Fast Techniques For Mining Association Rules*, Proceedings of the 20th International Conference on Very Large Databases, September 1994, [hereinafter "Fast Techniques For Mining Association Rules"]; M. Houtsma and A. Swami, *Set-Oriented Mining Of Association Rules*, Technical Report RJ 9567, IBM Almaden Research Center, October 1993, [hereinafter "Set-Oriented Mining of Association Rules"]; J. S. Park, M. S. Shen, and P. S. Yu, *An Effective Hash Based Technique For Mining Association Rules*, Proceedings of SIGMOD '95, May 1995; R. Agrawal, H. Mannila, R. Srikant, H. Toivonen, and A. I. Verkamo, *Fast Discovery Of Association Rules*, Advances in Knowledge Discovery and Data Mining, AAAI/MIT Press, edited by U. M. Fayyad, G. Piatetsky-Shapiro, P. Smyth, and R. Uthurusamy, 1995; H. Toivonen, *Sampling Large Databases For Association Rules*, Proceedings of the 22nd International Conference on Very Large Databases; A. Savasere, E. Omiecinski, and S. Navathe, *An Efficient Technique For Mining Association Rules In Large Databases*, Proceedings of the 21 st International Conference on Very Large Databases, September 1995; H. Mannila, H. Toivonen, and A. I. Verkamo, *Efficient Techniques For Discovering Association Rules*, Technical Report WS-94-03, American Association for Artificial Intelligence, 1994; R. Srikant and R. Agrawal, *Mining Generalized Association Rules*, Proceedings of the 21 st International Conference on Very Large Databases, September 1995; J. Han and Fu, *Discovery Of Multiple-Level Association Rules From Large Databases*, Proceedings of the 21st International Conference on Very Large Databases, September 1995; J. Han, Y. Cai, and N. Cercone, *Data—Driven Discovery Of Quantitative Rules In Relational Databases*, IEEE Transactions on Knowledge and Data Engineering, Vol. 5(1), pages 29–40, 1993; R. Srikant and R. Agrawal, *Mining Ouantitative Association Rules In Large Relational Tables*, Proceedings of the 1996 ACM SIGMOD International Conference of Management of Data, 1996; T. Fukuda, Y. Morimoto, S. Morishita, and T. Tokuyama, *Mining Optimized Association Rules For Numeric Attributes*, Proceedings of the 1996 ACM Symposium on Principles of Database Systems, 1996; R. Miller and Y. Yang, *Association Rules Over Interval Data*, Proceedings of SIGMOD '97, 1997; which are incorporated by reference herein.

Some of the techniques for knowledge extraction are for sequential patterns. R. Agrawal and R. Srikant, *Mining Sequential Patterns*, Proceedings of the 11th International Conference on Data Engineering, March 1995, which is incorporated by reference herein. Some of the techniques for knowledge extraction are for similarities in ordered data. R. Agrawal, C. Faloutsos, and A. Swami, *Efficient Similarity Search In Sequence Databases*, 4th International Conference on Foundations of Data Organization and Techniques, October 1993; C. Faloutsos, M. Ranganathan, and Y. Manolopoulos, *Fast Subsequence Matching In Time-Series Databases*, Proceedings of SIGMOD '94, May 1994; R. Agrawal, K. I. Lin, H. S. Sawhney, and K. Shim, *Fast Similarity Search In The Presence Of Noise, Scaling And Translation In Time-Series Databases*, Proceedings of the 21st International Conference on Very Large Databases, September 1995; R. Agrawal, G. Psaila, E. L. Wimmers, and M. Zait, *Querying Shapes Of Histories*, Proceedings of the 21st International Conference on Very Large Databases, September 1995; which are incorporated by reference herein.

Houtsma and Swami, in "Set-Oriented Mining of Association Rules", had proposed SETM, an SQL based technique for association. Their technique uses simple database operations (e.g., sorting and merge-scan joins) for performing association. However, their joins are more expensive as they are against the input data table and they do not have an efficient candidate set pruning such as the Apriori technique.

The size and growth of the data stores, matched by the growing reliability and large-volume handling capability of relational database systems, has caused much of the data to be managed by these database systems. The enhancement of database systems for query optimizations and parallelization and their widening portability across a multitude of system architectures, has made the integration of data mining techniques with the database system an attractive proposition. The integration of data mining applications and database systems, however, requires appropriate data organization, some modifications and/or enhancements in the database systems, and either changes in or entirely new data mining techniques.

A very important data mining application is "association" from a database performance perspective. An association rule is a grouping of attribute value pairs. The problem of mining for association rules was introduced initially for market-basket analysis. In market-basket analysis, the association rules provided associations between the set of items purchased together in a transaction. In general, an association rule has the form A=>B, where A and B are two disjoint sets of items. The association rule conveys that the occurrence of set A in a transaction implies that the set B also occurs in the same transaction.

The term support is used to refer to the frequency of observation of such a rule in the data. Support of a rule is a measure of frequency of the rule, which is defined as the ratio of transactions supporting the rule to the total number of transactions in the database, where a transaction is a collection of attribute-value pairs. For example, for attribute value pairs attribute2-value2 and attribute5-value5, if these attribute value pairs occurred five percent of the time in the database, then support of the rule is said to be five percent.

The term confidence is used to refer to the fraction of transactions that contain A and also contain B. Thus, support is the joint probability for A and B to occur together in a transaction, and confidence is the conditional probability for B to be found in a transaction given that A is found in it. For the generation of such rules from data mining, the user provides the minimum required support and confidence values. Then, all rules that have at least the minimum required support and confidence are generated.

A study of association shows that the physical data model used for the data input to the technique that generates association rules has a significant impact on the performance of the technique. A common physical data model used in market-basket analysis, referred to as single-column or SC data model, is inefficient when data resides in the database. For example, with the SC data model, a transaction involved the purchase of three items, then the SC data model would represent the transaction in a table with three rows, each row identifying the transaction and one of the three items. There is a significant performance degradation with the use of the SC data model to generate association rules because every item purchased in a transaction is represented by a single column.

There is a need in the art for an improved technique for generating mining association rules with an improved data model.

SUMMARY OF THE INVENTION

To overcome the limitations in the prior art described above, and to overcome other limitations that will become apparent upon reading and understanding the present specification, the present invention discloses a method, apparatus, and article of manufacture for computer-implemented use of object relational extensions for mining association rules.

In accordance with the present invention, data mining is performed by a computer to retrieve data from a data store stored on a data storage device coupled to the computer. A multi-column data store organized using a multi-column data model is received. One of the columns in the multi-column data store represents a transaction, and each of the remaining columns in the multi-column data store represents elements of that transaction. A combination operator is performed to obtain candidate itemsets of data from the multi-column data store, each itemset being a combination of a number of rows of the multi-column data store. Large itemsets of data are generated from the candidate itemsets, wherein each itemset has at least a minimum support. Association rules are generated from the large itemsets of data, wherein each association rule has at least a minimum confidence.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
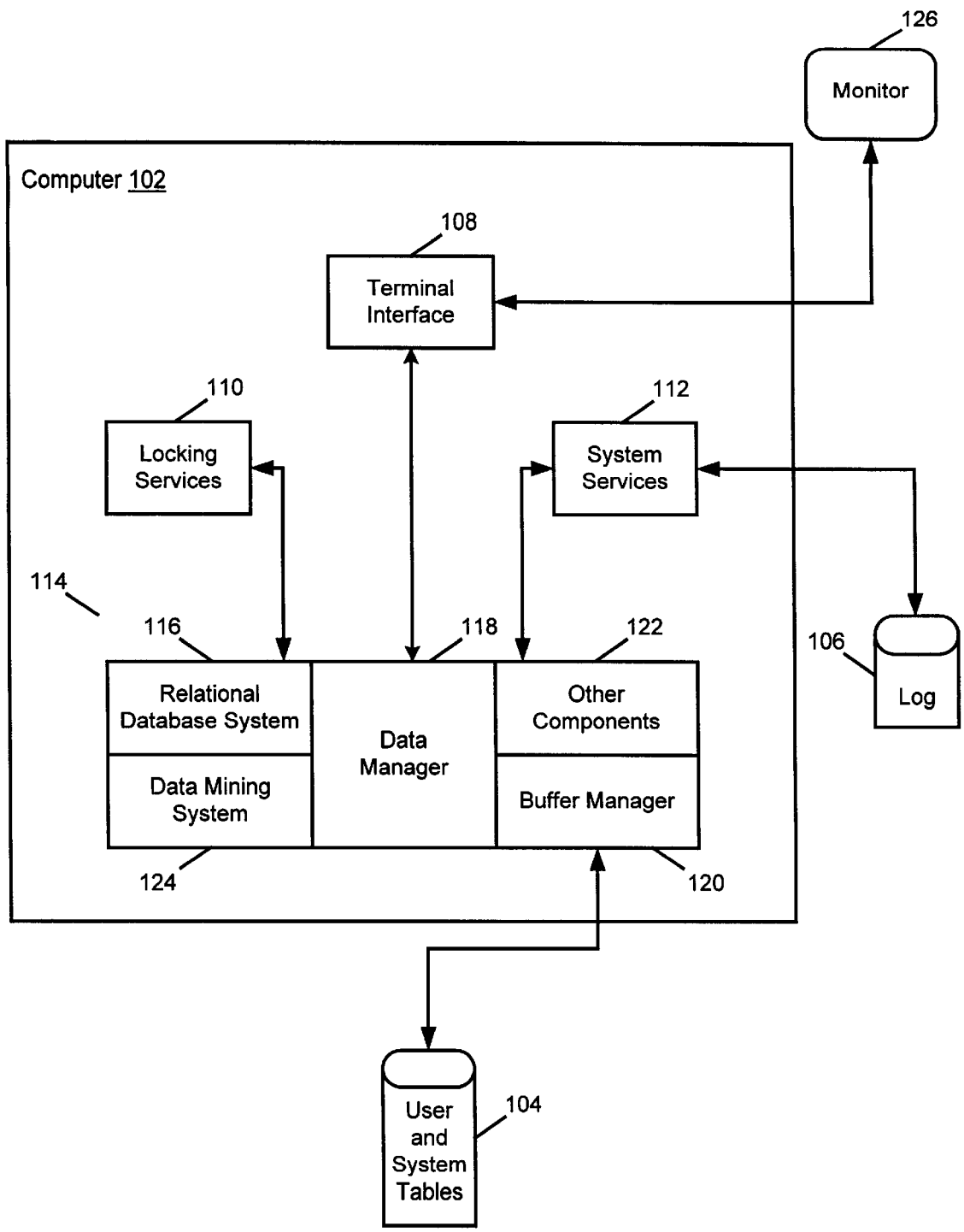
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, AIX®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for UDB ("Universal Database") for the AIX® operating system. Those skilled in the art will recognize, however, that the present invention has application to any RDBMS software, whether or not the RDBMS software uses SQL.

As illustrated in FIG. 1, the DB2® system for UDB for the AIX® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Data Mining System 124, and other components 122 such as an SQL compiler/interpreter. These submodules support the functions of the SQL language, i.e. definition, access control, interpretation, compilation, database retrieval, and update of user and system data. The Data Mining System 124 works in conjunction with the other submodules to perform data mining.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Using Object Relational Extensions For Mining Association Rules

One embodiment of the present invention provides a Data Mining System 124. The Data Mining System 124 provides an alternate physical data model for association, referred to as a multi-column (MC) data model, that can considerably improve generation of association rules in a database. The Data Mining System 124 uses an object-relational extension of the database system (i.e., user-defined functions, or "UDFs") to generate association rules in a MC data model.

The following discussion compares the performances between the SC data model and the MC data model. One commercial implementation of association based on the Apriori technique is described in "Fast Techniques For Mining Association Rules" and supports the SC data model. The Data Mining System 124 is described as a UDF model of the Apriori technique that supports the MC data model. The experimental results indicate that there is a reduction of up to a factor of six in the execution times for the MC data model compared to the SC data model.

The Data Mining System 124 has created a new relational operator, Combinations, which is used to implement the Apriori technique's association with the MC data model. The Data Mining System 124 shows how the Combinations operator can be effectively used in SQL queries to perform the complete set of tasks in the Apriori technique. The Data Mining System 124 implements the Combinations operator using new object-relational extensions of the DB2® system for UDB for the AIX® operating system. DB2 Universal Database (UDB), http://www.software.ibm.com/data/db2/, Web Document.

Initial experiments indicate that the performance of the implementation of the Combinations operator is comparable to that of earlier pure memory based implementations of the Apriori technique. In a pure memory based implementation, all of the data for the technique is in memory for the technique. While in a database implementation of the technique, the amount of data is typically so large that the data is stored in a database, requiring a number of I/O (input/output) operations to bring data into memory from a data storage device for manipulation.

The physical data model used for data mining can have a significant impact on the performance in databases. A multi-column (MC) data model is preferable over the single column (SC) data model from a performance perspective. Enhanced object-relational extensions of the database system are used to handle the MC data model. The MC data model, though applied in one embodiment of the invention to association, could be extended, in other embodiments of the invention, to any application that requires complete scans over the data residing in database tables.

The Apriori Technique

The Apriori technique proposed by Agrawal and Srikant, described in "Fast Techniques For Mining Association Rules", provides an efficient method for generating association rules. In general, the problem of generating association rules is subdivided into two tasks:

1. Determine the sets of items that have support greater than or equal to the user-specified minimum support (i.e., a support threshold). These sets of items are referred to as large itemsets. Determining large itemsets requires two elements:

a) A candidate-generation phase in which a set of itemsets, called candidate itemsets, are chosen, such that each candidate itemset contains all potential large itemsets.

b) A large-itemset generation phase in which the support for the candidate itemsets are counted, and those candidate itemsets with support greater than or equal to the user-specified minimum support qualify to become large itemsets.

2. Generate association rules from the large itemsets. A large itemset L, with a non-empty subset S, gives rise to the rule S⇒L−S if the ratio of the support of L to the support of S is greater than or equal to a user-specified minimum confidence (i.e., a confidence threshold).

Once the large itemsets are determined, the association rules can be generated in a straightforward manner, which is not very time consuming. The support counting task takes up the bulk of the time spent in processing and uses a large amount of memory. The Apriori technique obtains its efficiency by using potentially smaller candidate sets when counting the support for candidate itemsets to identify large itemsets. The Apriori technique uses the fact that, for a given support, all of the subsets of a large itemset need to be large itemsets themselves (i.e., all of the subsets of a large itemset must meet or exceed the support threshold). For example, if the set (A,B,C) were to be a large itemset (i.e., it has at least the minimum support), then all of its subsets, (A), (B), (C), (A,B), (B,C) and (A,C), would also have at least the minimum support.

The Apriori technique makes multiple passes over the input data to determine all of the association rules. For the following discussion, let $L_I$ denote the set of large itemsets of size I and $C_I$ denote the set of candidate itemsets of size I. Before making the Ith pass, the Apriori technique generates $C_I$ (i.e., the candidate itemset), using $L_{I-1}$ (i.e., the previous (I−1) large itemset). The candidate itemset generation process of the Apriori technique ensures that all of the subsets of size I−1 of $C_I$ are all members of the set $L_{I-1}$. In the Ith pass, the Apriori technique counts the support for all of the itemsets in $C_I$. At the end of the pass, all of the itemsets in $C_I$, with a support greater than or equal to the minimum support form the large itemset $L_I$.

This method of pruning the $C_I$ set using $L_{I-1}$ results in a much more efficient support counting phase for the Apriori technique when compared to the earlier techniques. In addition, the Apriori technique uses an efficient hash-tree implementation for the candidate itemsets. This makes the process of verifying whether an itemset present in a transaction belongs in the candidate itemset or not very efficient. If the itemset belongs to the candidate itemset, its corresponding support is incremented.

As originally proposed, the Apriori technique uses its own data structures for measuring the support and does not use any SQL queries in its implementation.

Physical Data Models For Association

Although there have been significant research efforts on association techniques, there has been no clear specification for a physical data model for the input data. The data for association is typically organized in a schema of the form of a transaction identifier and an item (Transaction_id, Item_id), hereafter referred to as a SC data model. Consider the example of retail sales data. For the sales made to a customer at any one instance (i.e., referred to as a transaction), there would be one entry for every item sold in the transaction. For example, for Transaction-1, if three items were purchased, the SC data model would show the following:

| | |
|---|---|
| Transaction-1 | Item-1 |
| Transaction-1 | Item-2 |
| Transaction-1 | Item-3 |

Thus, with the (Transaction_id, Item_id) schema, the Transaction_id value would be repeated for every item bought in that transaction.

The SC data model would be useful for performing relational queries against such data. Some of the early work in association, described in "Set-Oriented Mining of Association Rules", propose the use of relational queries in the implementation of association work with this data model. Further work in association, described in "Fast Techniques For Mining Association Rules", has shown a significant performance improvement by using techniques that did not use relational queries in their implementation. However, no change in the data model appears to have been proposed. Even commercial offerings of the later techniques have stayed with the SC data model.

For the purpose of association, the Data Mining System 124 proposes a data model of the form a transaction identifier followed by each item associated with that transaction (Transaction_id, Item_id1, Item_id2, . . . , Item_idC). The Data Mining System 124 refers to this as the multiple-column (MC) model. For example, for Transaction-1, if three items were purchased, the MC data model would show the following:

| | | | |
|---|---|---|---|
| Transaction-1 | Item-1 | Item-2 | Item-3 |

If C is the average number of non-null items in a row in the MC data model of the input data, the SC data model requires (C−1) times more rows (albeit shorter ones) to be read in, for every pass over the table.

In addition to analysis of market-basket data, association has been extended to provide rules for many other forms of business data. Here, the data is quite often found organized in a schema of the form (Record_Id, Attribute1, Attribute2, to AttributeC) in the MC data model. However, in order to perform association for even this kind of data, the data model is often changed to that of (Record_Id, Attribute), by pivoting the data about the values in Record_Id. The pivot operation incurs additional overhead both in terms of the CPU usage and significant disk space usage. Both these overheads are eliminated by the Data Mining System 124, which enables use of the MC data model with association rule generation.

The "Combinations" Operator For Association

The Data Mining System 124 proposes a new operator, Combinations, for implementing the Apriori technique through SQL on data in a MC data model. The Combinations operator takes a set of items and a number I as input, and returns the different combinations of size I from the input set of items as rows in a new table. The items in a row (i.e., the items in each itemset) are in lexicographic order. The result table has I number of columns. For example, for a row in the input table that contains the items A, B, C and D, the output of the Combinations operator, invoked with I=2, would be (A,B), (A,C), (A,D), (B,C), (B,D) and (C,D). In one embodiment, the Combinations operator could be implemented as a table function of the DB2® system for UDB for the AIX® operating system.

SQL Queries Using the "Combinations" Operator For Association

The candidates generation phase makes use of the Combinations operator. The candidate generation phase can be implemented in SQL using the Combinations operator as follows (for generating candidates for itemsets of size I+1):

INSERT INTO $C_{I+1}$

SELECT Ai1.item1, Ai1.item2, . . . , Ai1.itemI, Ai2.itemI

FROM $L_I$ Ai1, $L_I$ Ai2

WHERE Ai1.item1=Ai2.item1 AND
  Ai1.item2=Ai2.item2 AND
  . . .
  Ai1.itemI-1=Ai2.itemI-1 AND
  Ai1.itemI<Ai2.itemI AND
  (SELECT count(*)
  FROM $L_I$, Combinations(Ai1.item1. . . , Ai1.itemI, Ai2.itemI, I)
    AS g
  WHERE $L_I$.item1=g.item1 AND
    $L_I$.itemI=g.itemI
  )=I+1

Using the Combinations operator, the large itemset, $L_I$, generation phase of iteration I of the Apriori technique can be rewritten as follows:

INSERT INTO $L_I$

SELECT C.item1, . . . , C.itemI, count(*)

FROM Data D, $C_I$ C, Combinations(D.item1, . . . , D.itemC, I) AS g

WHERE C.item1=g.item1 AND . . . AND C.itemI= g.itemI

GROUP BY (C.item1, C.item2 . . . , C.itemI)

HAVING count(*)>=support where $C_I$ denotes the candidates for groups of size I generated in the candidates generation phase for iteration I. For every itemset in $L_I$, the value corresponding to its count gives the support for the itemset in the input data.

The Data Mining System 124 implements the Combinations operator using the object—relational extension, table—function. Like a UDF, the table—function is a user—defined method that can be used in SQL queries. The table—function returns a table to the query invoking it and is used in the FROM clause of an SQL query. This extension provides a highly flexible table construction utility to be used along with SQL.

Once all of the large itemsets are generated, the association rules are generated from them. For every itemset $S_I$ in $L_I$, the ratio of support of $S_I$ to the support of a subset $S_{I-1}$ in $L_I$ gives the confidence for the rule $S_{I-1}$=>$(S_I-S_{I-1})$. If this confidence value exceeds the minimum confidence, then the rule is considered a valid rule.

The Data Mining System 124 again uses a modified form of the Combinations operator to implement the association rule-generation with SQL. The modified operator, Combinations_plus, returns an input value, the support count, and the rest of the items in the input set, along with each of the combinations in the input set. The Combinations_plus operator can be used to generate the association rules as follows:

INSERT INTO $R_{I-1}$

SELECT g.item1, g.item2, . . . , g.itemI,
  g.count/$B_{i-1}$.count

FROM $L_I$ $A_i$, $L_{I-1}$ $B_{i-1}$,
  Combinations_plus($A_i$.item1, . . . , $A_i$.itemI, I-1,
  $A_i$.count) AS g WHERE g.item1=$B_{i-1}$.item1 AND
  . . .
  g.itemI-1=$B_{i-1}$.itemI-1 AND
  g.count/$B_{i-1}$.count>=minimum confidence In the table $R_{I-1}$, the first I-1 columns are the rule-head, the Ith column is the consequent, and the last column is the confidence factor for the rule. In particular, with the above query, the table $R_{I-1}$, would contain all rules of the form {head1, head2 . . . , headI-1}→ consequent, where head1 . . . headI-1 and consequent all are from the items in the input table for association. Thus, table $R_{I-1}$ has all the rules with I-1 items in the rule—head, a single item as the consequent, and the confidence factor. Combinations_plus is implemented as another table-function.

Figure 2:
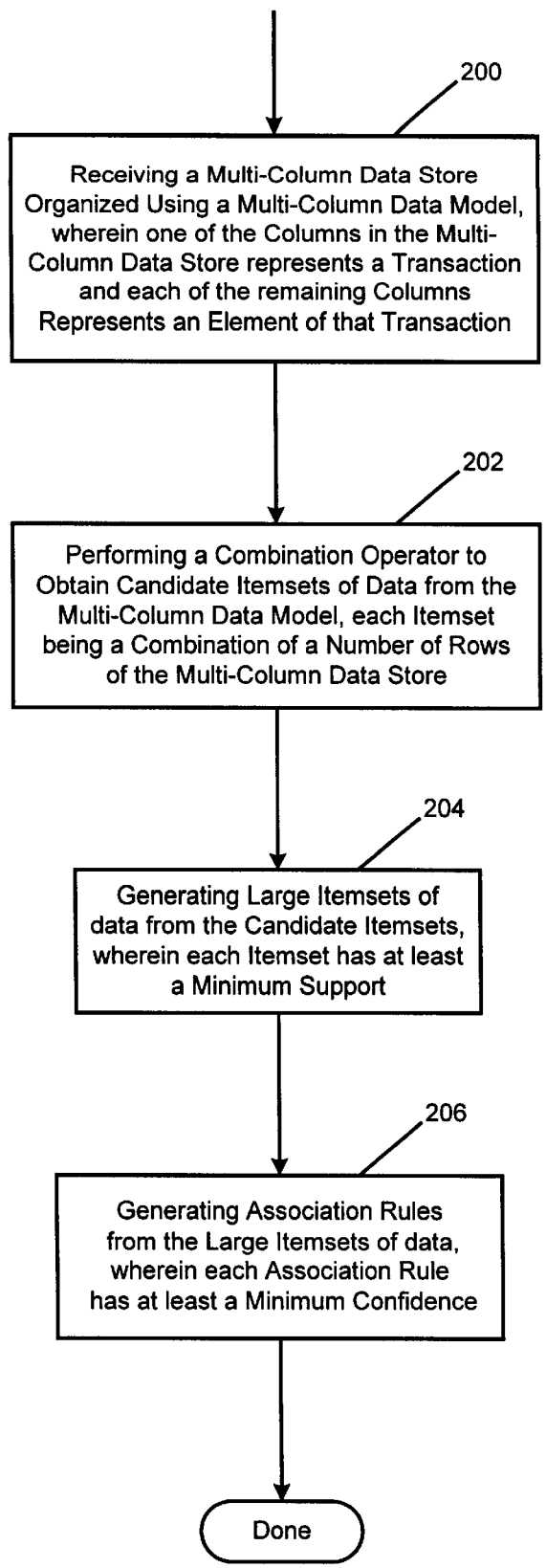
FIG. 2 is a flow diagram illustrating the steps performed by the Data Mining System 124.

FIG. 2 is a flow diagram illustrating the steps performed by the Data Mining System 124. In Block 200, the Data Mining System 124 receives a multi-column data store organized using a multi-column data model. One of the columns in the multi-column data store represents a transaction, and each of the remaining columns in the multi-column data store represents elements of that transaction. In Block 202, the Data Mining System 124 performs a combination operator to obtain candidate itemsets of data from the multi-column data store, each itemset being a combination of a number of rows of the multi-column data store. In Block 204, the Data Mining System 124 generates large itemsets of data from the candidate itemsets, wherein each itemset has at least a minimum support. In Block 206, the Data Mining System 124 generates association rules from the large itemsets of data, wherein each association rule has at least a minimum confidence.

EXAMPLE

The following discussion provides an example to better illustrate the Data Mining System 124. The Data Table provides input data, and the $L_1$ Table provides large itemsets of size 1 and their counts. The minimum support is two (i.e., 50%) in this example, and the minimum is 0.5.

| Data Table | | L₁ Table | |
|---|---|---|---|
| item1 | item2 | item1 | count |
| A | B | A | 3 |
| A | C | B | 3 |
| A | B | C | 2 |
| A | B | | |

In the candidate generation phase, the following SQL may be used with the Combinations operator to generate candidates:

INSERT INTO C₂
SELECT Ai1.item1, Ai2.item1
FROM L₁ Ai1, L₁ Ai2
WHERE Ai1.item1<Ai1.item1 AND
   (SELECT count (*)
   FROM L₁, Combinations (Ai1.item1, Ai2.item1, 1) AS g
   WHERE L₁.item1=g.item1 AND
     L₁.item2=g.item2)=2

The following table C₂ provides the candidates generated from the SQL code above:

| C₂ Table | |
|---|---|
| item1 | item2 |
| A | B |
| A | C |
| B | C |

In the large itemset generation phase, the following SQL may be used with the Combinations operator to generate large itemsets:

INSERT INTO L₂
SELECT C.item1, C.item2, count(*)
FROM Data D, C₂ C, Combinations (D.item1, D.item2, 2) AS g
WHERE C.item1=g.item1 AND C.item2=g.item2
GROUP BY (C.item1, C.item2)
HAVING count (*)>=2

The following table L₂ provides the large itemsets generated from the SQL code above:

| L₂ Table | | |
|---|---|---|
| item1 | item2 | count |
| A | B | 2 |

In the rule generation phase, the following SQL may be used with the Combinations_plus operator to generate rules:

INSERT INTO R₁
SELECT g.item1, g.item2, g.count/A₁.count
FROM L₂ B₂, L₁ A₁,
   Combinations_plus (B₂.item1, B₂.item2, 1, B₂.count) AS g
WHERE g.item1=A₁.item1 AND
   g.count/A₁.count>=0.5

The following table R₁ provides the rules generated from the SQL code above:

| R₁ Table | | |
|---|---|---|
| head1 | head2 | confidence |
| A | B | 2/3 |
| B | A | 2/3 |

Optimizations For Performance

In the large-itemset generation phase, using the Combinations operator on all of the items in one row (i.e., all of the items in a transaction), could result in too many unwanted combinations being generated. These would be eliminated by the Join with the candidates table $C_f$. However, performance could be greatly enhanced if they were not even generated. In order to do this, the Data Mining System 124 adds a new clause to the Combinations operator, an "in Set" clause. With the "in Set" clause, the Combinations operator generates combinations of only those items in the input set which are present in the set identified by the "in Set" clause. Incorporating the "in Set" clause into a table-function is done by passing the "in Set" clause through a pointer to a hash table containing all of the items in $C_f$. This is a relatively small set, and the memory management for this is trivial, compared to maintaining all of the candidate sets in memory.

In the candidates generation phase, the Data Mining System 124 can again use $L_{I-items}$ (i.e., a subset of the set of items in $L_I$) in place of $L_I$ (i.e., the set of items in the large itemset). $L_{I-items}$ is a subset of $L_I$ that becomes much smaller as I increases. Using a subset of the large itemset reduces the number of invocations of the Combinations operator for determining the candidates itemset.

Figure 3:
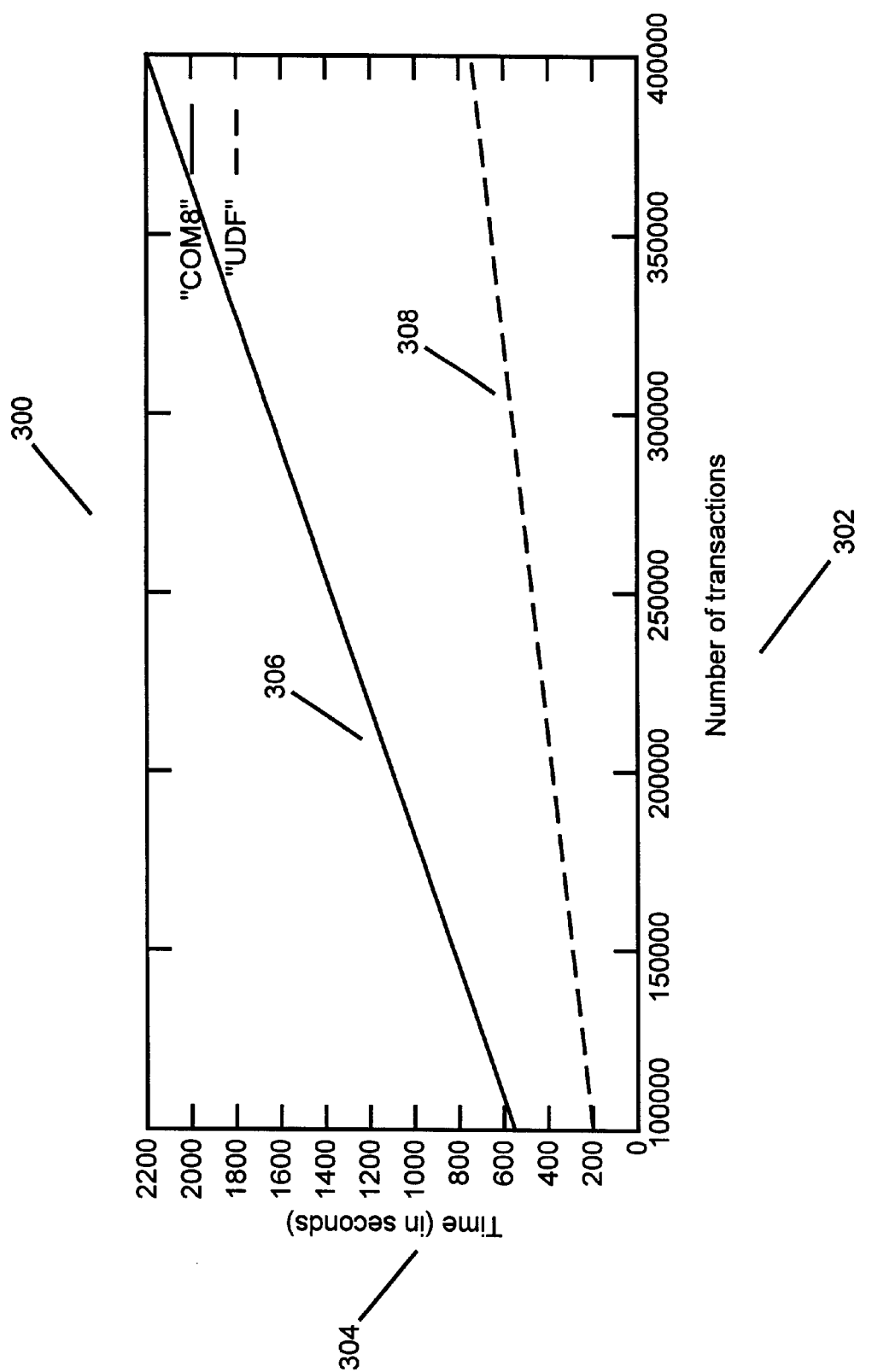
FIG. 3 is a graph illustrating execution times for one set of experiments with a support of 0.01.

The first set of experiments performed with the table function implementation yielded execution times that are between two to six times that of the UDF (in-memory) implementation of the Apriori technique. FIG. 3 contains a graph 300 illustrating the execution times for one set of these experiments with a support of 0.01. The graph 300 has a horizontal axis representing the number of transactions 302 and a vertical axis representing the time in seconds 304. Graph line 306 represents the results of the table function implementation, and graph line 308 represents the results of the UDF (in-memory) implementation. This set of experiments were run on a DB2® system for the UDB for the AIX® operating system version with 256 MB memory.

An optimization of the Data Mining System 124 can approximate the performance of that of UDF (in-memory) implementation of the Apriori technique. Currently in the execution, when generating the large itemset table, the output of the Combinations operator is created as a temporary table in the database and then joined with the candidates table. The Data Mining System 124, as optimized, avoids generating this temporary table, but directly increments the counts for the candidate sets (i.e., entries in the candidates table) when the table function outputs a suitable row (i.e., one that has a corresponding candidate table entry), and, thus, enhances the performance significantly.

Meo et. al. had proposed a SQL-like operator for mining association rules. R. Meo, G. Psaila, and S. Ceri, *A New SQL-Like Operator For Mining Association Rules*, Proceedings of the 22nd International Conference on Very Large Databases, 1996, which is incorporated by reference herein. Their work focused on providing a unifying model for the description of association rules, as opposed to an implementation of association using the database engine that the Data Mining System 124 provides.

Lakshmanan et. al. and Gyssens et. al have provided extensions to SQL to perform uniform manipulations of data and meta-data in multi-database systems. L.V.S. Lakshmanan, F. Sadri, and I. N. Subramanian, *Schemasql—A Language For Interoperability In Relational Multi-Database Systems*, Proceedings of the 22nd International Conference on Very Large Databases, 1996; M. Gyssens, L. V. S. Lakshmanan, and I. N. Subramanian, *Tables As A Paradigm For Querying And Restructuring*, Proceedings of the 1996 ACM Symposium on Principles of Database Systems, June 1996; which are incorporated by reference herein. In order to provide this, they support queries over various kinds of data organizations. This would facilitate the creation of operators that can act on row-data or data in the MC data model. The Combinations operator could be expressed as a query in their SchemaSQL language.

Comparison Of The MC Data Model And The SC Data Model

The Data Mining System 124 uses a simplified table-scan cost model to illustrate the benefit of the MC data model. Consider a table with R Transaction_ids, each one involving C number of items on the average. For the CPU costs for accessing the input data table, let $t_R$ denote the time associated with a row access for concurrency control, page-fix, etc. and let $t_c$ denote the CPU time required for a single column access. Then the CPU costs associated with both the models are as follows:

MC data model: $\text{CPU\_COST}_{MC} = t_R * R + t_c * R * C$

SC data model: $\text{CPU\_COST}_{SC} = t_R * R * C + t_c * R * C$

The cost difference comes out to the following:

$\text{CPU\_COST}_{SC} - \text{CPU\_COST}_{MC} = R * t_R * (C-1)$

Thus, the Data Mining System 124 shows that the CPU cost difference between the SC data model and the MC data model is equal to the (number of transactions) times the (time for row access) times (one less than the number of items). Thus, the CPU cost difference increases as the number of rows in the table increases and also as the average number of items in a transaction grows. That is, the SC data model gets more expensive based on these factors.

The I/O cost is proportional to the volume of data obtained for both models. Let $S_h$ denote the size of the header associated with each row in the database table, $S_i$ denote the number of bytes per item, and $S_t$ denote the size of the transaction identifier. In the case of the MC data model, since the items are already grouped by transaction identifier in each row, the transaction identifiers need not be scanned in the database. However, for the SC data model, since the grouping by transaction identifier has to be done, the transaction identifier values also need to be scanned in from the database. The volume of data obtained for the models is as follows:

MC data model $\text{Vol}_{MC} = R * (S_h + C * S_i)$

SC data model $\text{Vol}_{SC} = R * C * (S_h + S_i + S_t)$

The volume difference comes out to the following:

$\text{Vol}_{SC} - \text{Vol}_{MC} = R * (S_h * (C-1) + S_t * C)$

The volume difference is the (number of transaction identifiers) times ((the size of a header of a row) times (one less than the number of items in a transaction) plus (the size of the transaction identifier times the number of items). Here, the Data Mining System 124 shows that the I/O cost difference also increases with an increase in the number of rows and with an increase in the average number of items in a transaction.

In the above models, the cost for handling the null entries in the MC data model was ignored. If $t_n$ is considered the CPU cost for processing a null item, the Data Mining System 124 obtains the condition $(N-C)/(C-1) \hat{1} t_R/t_n$ for the SC data model to have a higher CPU cost. Similarly, if $S_n$ is considered to be the size of the null indicator, for the I/O cost of the SC data model to be greater than the I/O cost of the MC data model, the Data Mining System 124 gets the condition $(S_h*(C-1)+S_t*C)>S_n*N$. As long as the value of N is appropriately chosen (relative to C), these conditions would hold for most databases.

The performance of two implementations for association are compared, one working with the SC data model and the other with the MC data model for the input database table. Both the implementations are based on the Apriori technique. The Apriori technique was chosen because it does not require the use of relational operations in its implementation, and, thus, can operate without the SC data model. Also, the Apriori technique is a widely used point of comparison for various studies on association. In addition, the Apriori technique is the technique of choice for the commercial implementation of association in IBM's Intelligent Miner (IM) Data Mining Suite. IBM Intelligent Miner, http//www.software.ibm.com/data/intelli-mine/, Web Document.

The Data Mining System 124 modifies the optimized Intelligent Miner implementation of the Apriori technique for the SC data model. For the MC data model, the Data Mining System 124 uses one of the object-relational extensions for the DB2® system, called user-defined functions (UDFs), which are further described in D. Chamberlin, *Using The New DB2-IBM's Object-Relational Database System*, Morgan Kaufmann, 1996, which is incorporated by reference herein. A UDF is a user-defined method that provides an application program the means to perform computation on retrieved records inside the database system. In one implementation, every row of data is passed from the MC data model table to the UDF function. All of the computations and generation of rules is done by the code inside the UDF.

The UDFs in the DB2® system can be run in two modes, either fenced or unfenced. In the unfenced mode, the UDFs share the database's address space, avoiding the overhead of switching from the database's address space to the application's address space, when data is obtained from the database to the application. In the fenced mode, the UDFs run in the application's address space, which is distinct from the database's address space. Agrawal and Shim have shown the benefit to be obtained by running UDFs in the unfenced mode. R. Agrawal and K. Shim, *Developing Tightly-Coupled Data Mining Applications On A Relational Database System*, Proceedings of the 2nd International Conference on Knowledge Discovery in Databases and Data Mining, August 1996, [hereinafter "Developing Tightly-Coupled Data Mining Applications On A Relational Database System"], which is incorporated by reference herein. Experiments were conducted with UDFs running in the fenced mode, to provide the same environment for the current implementation as for the Intelligent Miner implementation of the Apriori technique, in which all of the computations are performed in the application's address space.

Agrawal and Shim, in "Developing Tightly-Coupled Data Mining Applications On A Relational Database System", have shown the benefit of using UDFs for the development of applications tightly coupled with the database engine. Their focus in using the UDF for association, however, was not for its use with the MC data model.

Tests were also performed with a UDF implementation for the SC data model, and the UDF implementation for the SC data model was up to a factor of 2–3 times slower than the highly optimized Intelligent Miner implementation of the SC data model. Hence, the Data Mining System 124 uses Intelligent Miner's implementation as representative of the SC data model. The data structures and the computation modules are quite similar for both the Intelligent Miner and UDF implementations. The only difference lies in the extraction of data from the database. The Intelligent Miner obtains the data from a table with data in the SC data model, and the UDF obtains the data from a table in the MC data model.

The experiments were conducted on an IBM PowerStation 590, that has a 66 Mhz Power2 processor with 512 MB memory, with a 1.07 GB serial-link disk drive. The mining data was drawn from sales data of a retail store chain, with transactions drawn over various periods of time. The data has an average of 12 items per sale (i.e., the SC data model has about 12 times the number of rows as the MC data model). The UDF implementation for the MC data model supported a maximum of 60 items per transaction, and the input data under both the SC and MC data models were identical.

Figure 4:
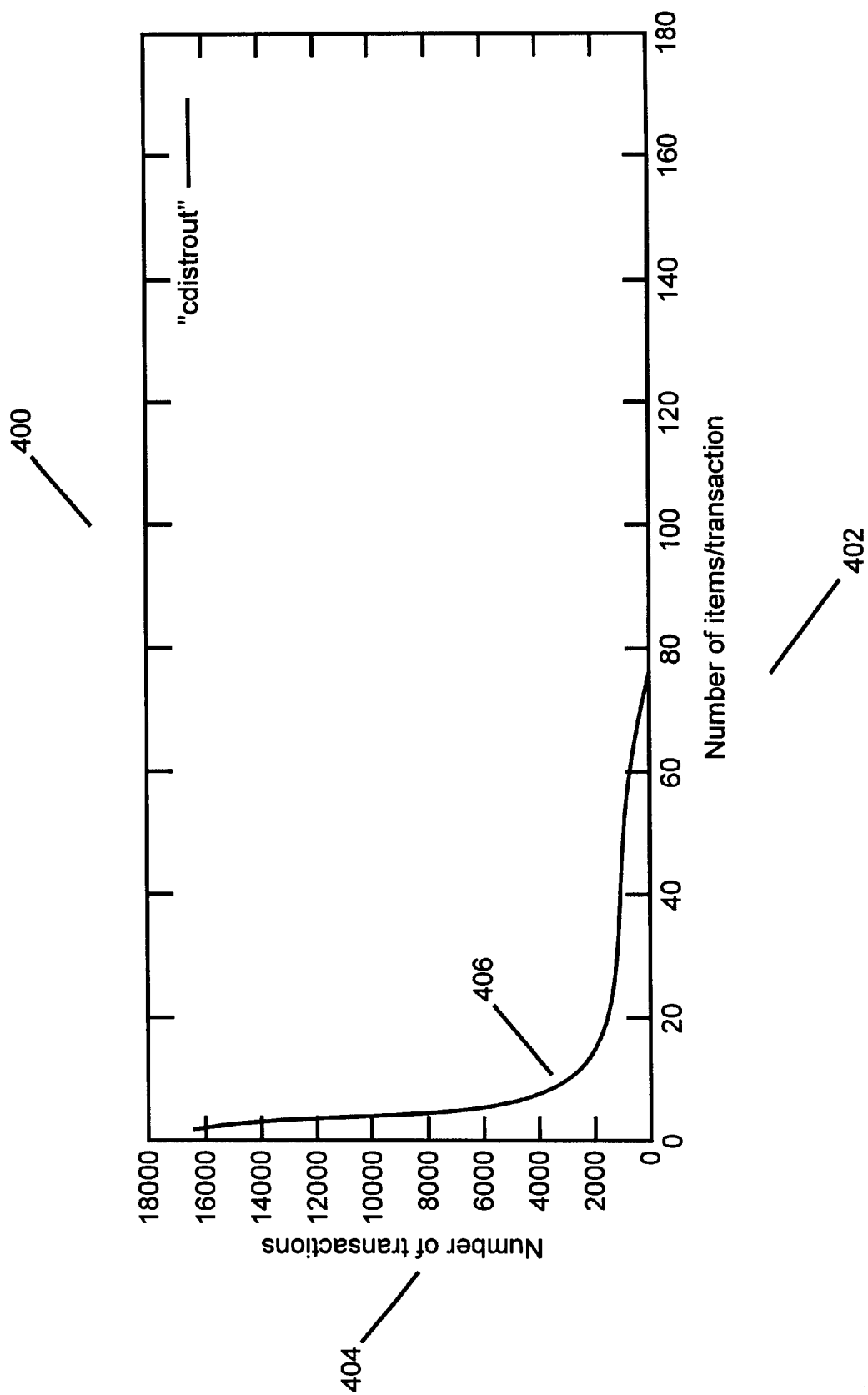
FIG. 4 is a graph illustrating the distribution for the number of items per transaction.

FIG. 4 is a graph 400 illustrating the distribution for the number of items per transaction. The graph 400 has a horizontal axis representing the number of items per transactions 402 and a vertical axis representing the number of transactions 404. Graph curve 406 represents the distribution. From FIG. 4, it can be seen that there are only a negligible number of transactions that have more than 60 items per transaction. The experiments were run, varying the total number of transactions from 100K–400K, to verify the performance characteristics over a range of input sizes.

Figure 5:
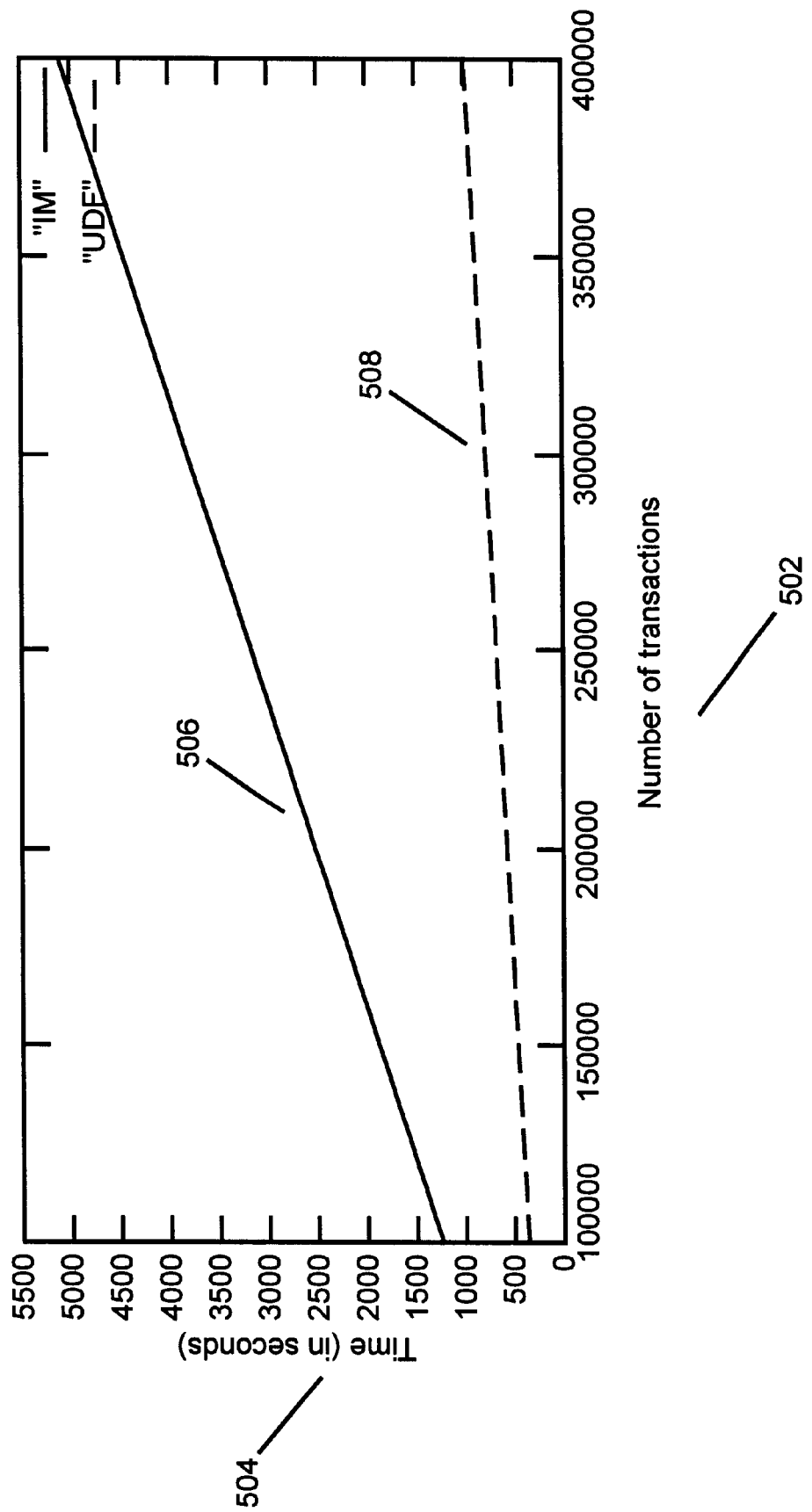
FIG. 5 is a graph illustrating the time curves for the Intelligent Miner and the UDF implementations.

FIG. 5 is a graph 500 illustrating the time curves for the Intelligent Miner using a SC data model and the UDF implementation using a MC data model. The graph 500 has a horizontal axis representing the number of transactions 502 and a vertical axis representing the time in seconds 504. Graph line 506 represents the results for the Intelligent Miner, and graph line 508 represents the results of the UDF implementation. The ratio of the association time for the Intelligent Miner to the UDF implementation time varies between 4.8 to 6. This factor, significant even for single runs, becomes very important when repeated association runs need to be performed over the input data, with varying support and confidence. The results, clearly indicate the superiority of the MC data model over the SC data model for database tables used as input for association.

FIG. 5 also shows the execution times for the pivot operation when original data is available in the MC data model and needs to be converted to the SC data model for the SC data model implementation. The sum of the pivot and Intelligent Miner association times gives the total association time for the SC data model, when the original input data is in the MC data model. In such a situation, the ratio of the total Intelligent Miner time (i.e., pivot time summed with association time) to the total UDF time when input data is in the MC data model varies from 14 to 15.7. Thus, when the input data is in the MC data model, as is the case with much of non-market-basket data, there is more than an order of magnitude improvement with the UDF implementation. The ratio of just the association times indicates that it is preferable to have the input data in the MC data model for performing association.

Summary of Disclosure

The Data Mining System 124 has shown that the MC data model is the better physical data model, as compared to the SC data model, for association. The results show that significant performance improvement can be obtained for the MC data model. The Data Mining System 124 has also provided the operator ("Combinations") necessary for performing SQL-query based implementation of the Apriori technique over the MC data model. The initial experiments with the implementation of the Combinations operator using the table-function object-relational extension yields performance comparable to that of Intelligent Miner. This provides a convenient method for performing association in the database engine using the optimization and parallelization in the database system for the benefit of the application. It also provides a scalable implementation, which is not memory bound, for the Apriori technique.

The Data Mining System 124 provides careful attention to the data model and access pattern and provides suitable extensions to the relational database system to meet the new requirements of data mining applications.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method of data mining in a computer, the data mining being performed by the computer to retrieve data from a data store stored on a data storage device coupled to the computer, the method comprising the steps of:

receiving a multi-column data store organized using a multi-column data model, wherein one of the columns in the multi-column data store represents a transaction and each of the remaining columns in the multi-column data store represents items of that transaction;

performing a combination operator in a relational database management system to obtain candidate itemsets of data from the multi-column data store, each itemset being a combination of a number of rows of the multi-column data store;

generating large itemsets of data from the candidate itemsets, wherein each itemset has at least a minimum support; and generating association rules from the large itemset of data, wherein each association rule has at least a minimum confidence.

2. The method of claim 1, wherein the combination operator receives the multi-column data store and itemset number, further comprising the step of performing the combination operation to generate an itemset number of combination itemsets.

3. The method of claim 2, wherein the combination operator returns an input value, the support count, the remaining items in the input set, and combination itemsets.

4. The method of claim 2, wherein the combination operator generates combination itemsets of only those items in the input set that are also in another, specified set.

5. The method of claim 1, wherein the step of generating large itemsets further comprises the step of performing the combinations operator.

6. The method of claim 1, wherein the step of generating association rules further comprises the step of performing a new combinations operator.

7. The method of claim 1, wherein support is a measure of frequency of the association rule, which is defined as the ratio of transactions supporting the association rule to a total number of transactions.

8. The method of claim 1, wherein confidence is a conditional probability for a first element to be found in a transaction given that a second element is found in the transaction.

9. An apparatus for data mining, comprising:

a computer having a memory and a data storage device coupled thereto, wherein the data storage device stores a data store;

one or more computer programs, performed by the computer, for receiving a multi-column data store organized using a multi-column data model, wherein one of the columns in the multi-column data store represents a transaction and each of the remaining columns in the multi-column data store represents items of that transaction, for performing a combination operator in a relational database management system to obtain candidate itemsets of data from the multi-column data store, each itemset being a combination of a number of rows of the multi-column data store, for generating large itemsets of data from the candidate itemsets, wherein each itemset has at least a minimum support, and for generating association rules from the large itemset of data, wherein each association rule has at least a minimum confidence.

10. The apparatus of claim 9, wherein the combination operator receives the multi-column data store and itemset number, further comprising means for performing the combination operation to generate an itemset number of combination itemsets.

11. The apparatus of claim 10, wherein the combination operator returns an input value, the support count, the remaining items in the input set, and combination itemsets.

12. The apparatus of claim 10, wherein the combination operator generates combination itemsets of only those items in the input set that are also in another, specified set.

13. The apparatus of claim 9, wherein the means for generating large itemsets further comprises the means for performing the combinations operator.

14. The apparatus of claim 9, wherein the means for generating association rules further comprises the means for performing a new combinations operator.

15. The apparatus of claim 9, wherein support is a measure of frequency of the association rule, which is defined as the ratio of transactions supporting the association rule to a total number of transactions.

16. The apparatus of claim 9, wherein confidence is a conditional probability for a first element to be found in a transaction given that a second element is found in the transaction.

17. An article of manufacture comprising a program storage medium readable by a computer and embodying one or more instructions executable by the computer to perform method steps for data mining, the data mining being performed by the computer to retrieve data from a data store stored on a data storage device coupled to the computer, the method comprising the steps of:

receiving a multi-column data store organized using a multi-column data model, wherein one of the columns in the multi-column data store represents a transaction and each of the remaining columns in the multi-column data store represents items of that transaction;

performing a combination operator in a relational database management system to obtain candidate itemsets of data from the multi-column data store, each itemset being a combination of a number of rows of the multi-column data store;

generating large itemsets of data from the candidate itemsets, wherein each itemset has at least a minimum support; and generating association rules from the large itemset of data, wherein each association rule has at least a minimum confidence.

18. The article of manufacture of claim 17, wherein the combination operator receives the multi-column data store and itemset number, further comprising the step of performing the combination operation to generate an itemset number of combination itemsets.

19. The article of manufacture of claim 18, wherein the combination operator returns an input value, the support count, the remaining items in the input set, and combination itemsets.

20. The article of manufacture of claim 18, wherein the combination operator generates combination itemsets of only those items in the input set that are also in another, specified set.

21. The article of manufacture of claim 17, wherein the step of generating large itemsets further comprises the step of performing the combinations operator.

22. The article of manufacture of claim 17, wherein the step of generating association rules further comprises the step of performing a new combinations operator.

23. The article of manufacture of claim 17, wherein support is a measure of frequency of the association rule, which is defined as the ratio of transactions supporting the association rule to a total number of transactions.

24. The article of manufacture of claim 17, wherein confidence is a conditional probability for a first element to be found in a transaction given that a second element is found in the transaction.

* * * * *